United States Patent Office 3,445,642
Patented May 20, 1969

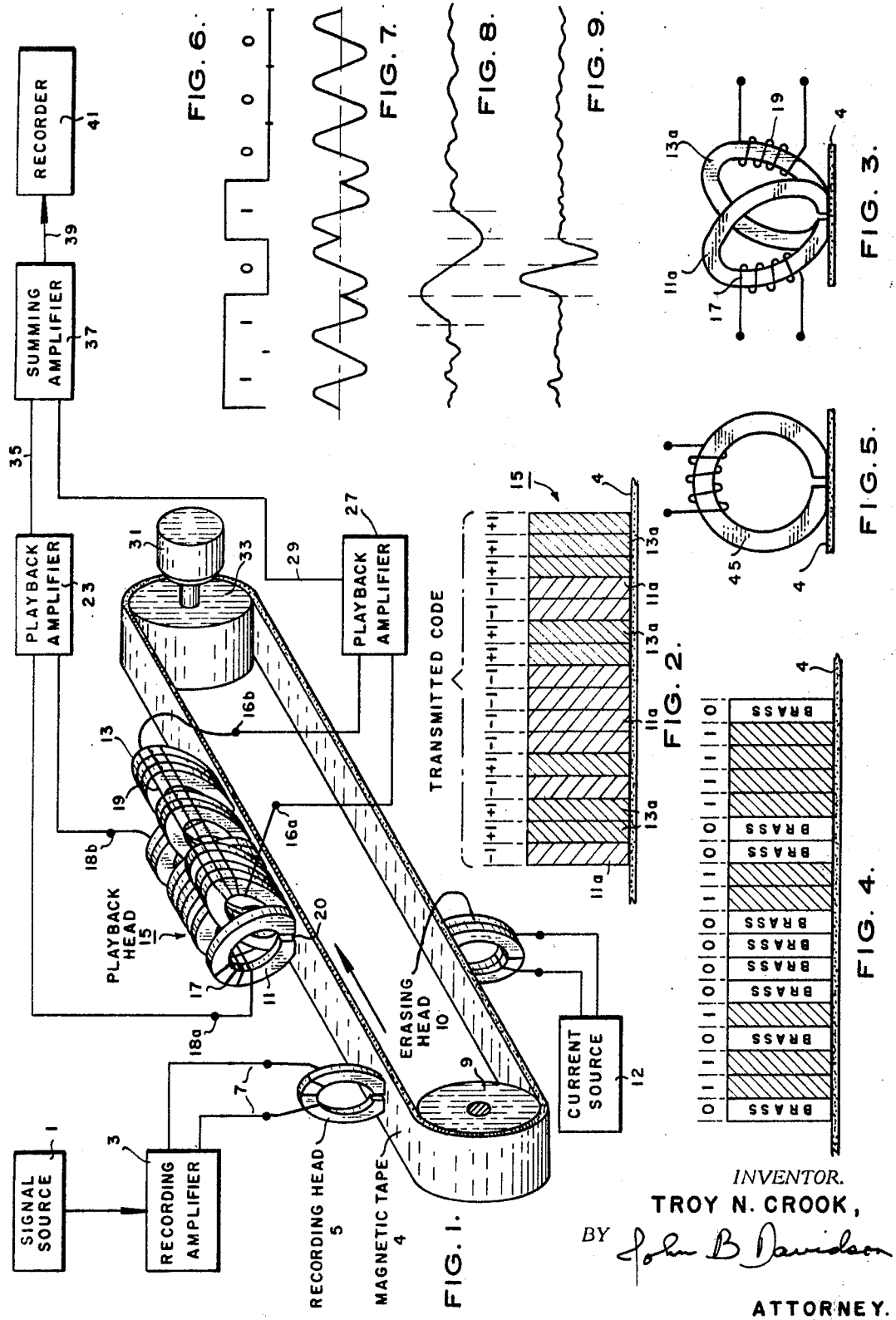

3,445,642
APPARATUS FOR DETERMINING THE TIME PHASE RELATIONSHIP OF ELECTRICAL SIGNALS
Troy N. Crook, Houston, Tex., assignor to Esso Production Research Company, a corporation of Delaware
Filed Sept. 24, 1965, Ser. No. 489,878
Int. Cl. G06g 7/19, 7/18; G06f 15/34
U.S. Cl. 235—181                        3 Claims

ABSTRACT OF THE DISCLOSURE

The invention is a device for determining the time phase relationship of components of a complex electrical signal wherein the signal is recorded on a magnetic recording medium and a reproducing head comprising a plurality of sets of laminations are linearly positioned one relative to the other according to a predetermined spatial relationship, the laminations of one set representing binary digits of one character and the laminations of the second set representing binary digits of the opposite character. Spatially arranged electrical windings are connected to the two sets for producing electrical signals which are integrated and summed, the summed signal being recorded.

---

This invention relates to apparatus for determining the time-phase relationship of components of a complex electrical signal, and more particularly to apparatus for determining the relative time location in a complex electrical signal of one component containing a characteristic that is distributed in time in accordance with a predetermined time distribution. Complex electrical signals of the type referred to above are obtained in the course of geophysical prospecting using the seismic technique.

Various techniques are used in connection with seismic prospecting. One type that has found increasing use in recent years involves injecting an elongated vibratory seismic signal into the earth and detecting the resulting seismic waves produced thereby at one or more detecting stations removed from the transmitting location. The signals are operated on or varied in various manners in order that the time interval required for the seismic signals to travel down into the earth, to be reflected by a subsurface reflecting horizon, and to travel back to the earth's surface may be measured. A counterpart or replica electrical signal of the transmitted signal is produced by various techniques, such as by geophones stationed at or very near the transmitting location. The counterpart or replica signal is correlated with each detected signal. Correlation between the counterpart or electrical signal and an electrical signal representative of detected seismic waves, as it has been practiced in the past, is a very time-consuming process and has been one of the shortcomings of the method.

The most successful technique for varying the transmitted signal to permit the time measurement indicated above has been to vary one of the characteristics of he injected signal (e.g., phase or amplitude in accordance with a shift register or null sequence binary code of maximal length. The term "shift register" or "null sequence binary code of maximal length" signifies a binary code formed by operating on a binary code group of $n$ digits according to a predetermined rule of formation such that the code group will not repeat itself before $2^n-1$ digits. Expressed in another manner, the binary code of maximal length is the binary code wherein a binary group of $n$ digits at the beginning thereof is not repeated until the code has $2^n-1$ digits therein. For example, if the code group 01101 is used, $n$ will be equal to 5 and $2^n-1=31$. A shift register binary code of maximal length can be formed therefrom by starting off with a code group 01101 and setting the next element equal to the sum modulo 2 of the first, second, third, and fifth digits preceding it. This process is repeated for each successive element and the following code group is obtained:

0110100001100100111110111000101

By applying the above-specified rule of formation it will be found that after 31 elements the sequence will repeat. For a more complete discussion of shift register or null sequence code of maximal length, reference may be had to the following: "The Synthesis of Linear Sequential Coding Networks," by D. A. Huffman, Proc. Third London Symposium on Information Theory, September 1955; and "Several Binary-Sequence Generators," by N. Zierler, Tech. Rep. 95, Lincoln Laboratory, Massachusetts Institute of Technology, Cambridge, Mass., September 1955.

Injecting a binary code of maximal length into the earth in the form of a seismic signal presupposes that a characteristic of the seismic signal is variable between two distinct conditions. For example, the amplitude may be varied between two magnitudes or a phase may be varied between two phase relationships. As a specific example, the injected signal may be made from a constant frequency sinusoidal signal of constant amplitude, a cycle of which is varied between mutually opposite phase relationships in accordance with the binary code of maximal length. This is one example of an electrical signal, or a component of a complex electrical signal, which contains a characteristic that is distributed in time in accordance with a predetermined time distribution.

It has been the usual practice to record in reproducible form the electrical replica signal and the electrical signal produced by detecting the seismic signals so that the electrical signal subsequently may be reproduced and cross-correlated to determine the time-phase relationship producing a maximum correlation value. For various reasons it has been found necessary to perform a correlation operation at a time subsequent to the time of the seismic observation. For example, the correlation operation performed according to many prior art techniques consumes an inordinately large amount of time. Also, since it is extremely costly to maintain a seismic crew in the field, as much as possible of the crew's time must be spent making seismic observations. Manifestly, it is desirable to perform a correlation operation immediately after making a seismic observation so that the results thereof can be used as a guide for immediately subsequent seismic observations. Therefore, it is desirable to have available a technique for performing "on line" correlation.

In accordance with one aspect of the present invention, there is provided an apparatus for determining the time-phase relationship of components of a complex electrical signal having at least one signal component containing a characteristic that is distributed in time and in accordance with a predetermined time distribution. This apparatus comprises a magnetic recording medium, a transport means for the recording medium, and a recording head operatively positioned relative to the recording medium to record the complex electrical signal thereon. Operatively positioned relative to the recording medium is a reproducing head comprising at least one set of spaced-apart magnetic conductors linearly positioned one relative to the other proportional to the relative time distribution of said characteristic in said signal component. Circuit means are coupled to the magnetic conductors for producing an electrical signal indicative of the total magnetic flux in the electrical conductors at any time. Means connected to the circuit means is provided for producing a recording indicative of the electrical signal produced by the circuit means. When the magnetic conductors are in space coincidence with the recorded signal components mentioned above, the output signal recorded by the recording means will reach an extreme value so that the relative time position of the signal component in the complex electrical signal can be readily determined.

Objects and features of the invention not apparent from the foregoing discussion will become evident upon consideration of the following detailed description thereof taken in connection with the accompanying drawings, wherein:

FIG. 1 is a schematic diagram of a preferred embodiment of the invention;

FIG. 2 is a side view of the moded playback head 15 and magnetic tape shown in FIG. 1;

FIG. 3 is an end view of the apparatus illustrated in FIG. 2;

FIGS. 4 and 5 are views similar to FIGS. 2 and 3 respectively, illustrating another embodiment of the invention;

FIG. 6 is a waveform representation of a square wave binary signal;

FIG. 7 is a waveform representation of a coded reverse sine wave signal such as may be used in connection with the invention; and FIGS. 8 and 9 are correlation curves such as may be obtained when the reverse sine wave curve of FIG. 7 is used in connection with the invention.

Attention is now directed to the preferred embodiment of the invention illustrated in FIG. 1. It will be assumed in the following discussion that the invention is to be used in the art of seismography and that the data signals to be correlated are obtained by vibrating the earth with a continuous wave, elongated seismic signal, varied between two or more conditions in accordance with a predetermined code, and that the data signals are obtained by detecting the seismic signals at a location spaced from the transmitting location at which the seismic signals were injected into the earth. The general technique is discussed in several patent applications assigned to the assignee of the present invention, such as U.S. Patent 3,185,958 of H. T. Masterson et al. Electrical source 1 may be a geophone or a patch of geophones, or may be a recorder on which geophone signals have been recorded and from which the signals may be faithfully reproduced. The electrical signals from source 1 are applied to a recording amplifier, the function of which is to adjust the amplitude of the signals from source 1 to a level suitable for recording on a magnetic recording medium. The output signals from recording amplifier 3 are applied to the winding of a magnetic recording head 5 through line 7. The recording head 5 is operatively positioned relative to a recording medium 4, which may be a conventional magnetic tape such as is customarily used in seismic observations, to record the electrical signal on the recording medium. The recording head 5 may be a conventional, annular magnetic conductor having a slot therein so that magnetic lines of force preferentially pass through the magnetic portion of the magnetic tape adjacent thereto. The magnetic tape is carried by a transport means, here shown as a pair of spaced-apart rollers 9 and 33, roller 33 being driven by an electrical motor. A more conventional motor-driven recording drum may be used as the transport device, or the tape may be eliminated and a drum having a magnetic outer surface may be used. A reproducing or playback head 15 and an erasing head 10 are also positioned in operative relationship to the magnetic tape 4 in the order named relative to the recording head 5 progressing in the direction of motion of the magnetic tape 4. The winding of the erasing head 10 is electrically coupled to a high-frequency current source 12 adapted to erase relatively low frequency signals previously recorded on the tape by the recording head 5.

Reference is now made to FIGS. 1, 2, and 3 which, taken together, illustrate the construction of the coded playback head 15. The playback head illustrated therein comprises two sets of magnetic conductors or laminations which are generally elliptically annular in shape and each of which is provided with a slot or head gap 20. The position of the head gap 20 in any given magnetic conductor is such that the set 11 of conductors is canted on one side of a plane normal to the surface of the tape 4, and the conductors 13 are canted on the other side of the plane when the head gaps are aligned adjacent the tape so that magnetic lines of flux passing through the conductors will also preferentially pass through the tape.

At this point it is desirable to digress to discuss the signals that are recorded by recording head 5. As has been indicated, the signal is a complex electrical signal made of a number of components. At least one of the components contains a characteristic that is distributed in time in accordance with a predetermined time distribution. When the time distribution is determined by a binary code group, the characteristic can be distributed in time in several manners. For example, the amplitude of the signal can be varied between two levels as illustrated in FIG. 6, or a sinusoidal signal can be varied between mutually opposite phases such that one phase represents one digit of the binary code group and the other phase represents the opposite digit of the binary code group. The former is illustrated in FIG. 6 and the latter is illustrated in FIG. 7, the binary code group represented thereby being 1101000.

With reference again to FIGS. 1, 2, and 3, and assuming the signal recorded by the recording head 5 has a characteristic distributed in time in accordance with a binary code, the various conductors in the sets of conductors designated by the reference numerals 11 and 13 will be distributed linearly along the tape in accordance with the digits of the code group, the magnetic conductors 11 representing one digit and the magnetic conductors 13 representing the other digit. As best illustrated in FIG. 2, the individual magnetic conductors 11a will represent the binary digit −1, and the individual conductors 13a of the set 13 will represent the binary digit +1 (as is well known, the digits of a binary code can be represented by the designations +1 and −1 as well as 1 and 0). The various magnetic conductors 11a and 13a are illustrated as abutting one against the other, but manifestly, they can be spaced as desired, preferably by segments which are not magnetic conductors which may be formed of brass. The magnetic conductors themselves may be formed of Mu-metal or other known metals having high magnetic permeability. The width of the conductors should not be greater than the distance along the time axis of the magnetic tape on which one binary bit is recorded, it being assumed that the binary bits are of equal duration in the complex electrical signal recorded by the recording head 5. As indicated above, the conductors are linearly disposed. They can be either rectilinearly disposed, as illustrated in FIG. 1, or curvelinearly disposed, as when a more conventional recording drum is used as the transport mechanism.

The changes in magnetic flux in each set of windings 11 and 13 produce an electrical current in coils 17 and 19. The coils 17 and 19 are wound on sets of conductors 11 and 13, respectively, in such a manner that the rate of change of the total magnetic flux at any instant in one of the sets of magnetic conductors is proportional to the electrical signal generated by the winding corresponding to that particular set of magnetic conductors. This can be done as illustrated in FIG. 1 by having one coil looped through and around the set of magnetic conductors, or by having individual windings on each individual magnetic conductor and connecting the windings additively together with the end windings connected to terminals 18a, 18b for the windings on conductor set 11, and to terminals 16a, 16b for the windings on terminal set 13.

Inasmuch as the electrical signals produced by the windings 17 and 19 are indicative of the rate of change of magnetic flux in the windings, it is necessary to integrate the signals if an output voltage is to be obtained which is indicative of the flux present in the conductors at any given instant. Therefore, terminals 18a and 18b are connected to an integrating playback amplifier 23, and terminals 16a and 16b are connected to an integrating playback amplifier 27. Amplifiers 23 and 27 may be any type of integrating amplifier well known to the art. The output signals of the integrating amplifier are added together on an instant-to-instant basis by a summing amplifier 37, the output signal of which is connected to a conventional recorder 41 by line 39. The recorder 41 may be a magnetic recorder or a visual-type recorder such as is well known to the art. The visual recordations may be on a variable amplitude basis, on a variable density basis, or on a variable color basis as a function of time.

The operation of the apparatus described above is as follows. Let it be assumed that the electric motor 31 is driving the tape transport mechanism at a constant speed and that a complex signal having one component which has a characteristic distributed in time in accordance with a predetermined time distribution is being produced by source 1 and recorded by recording head 5. More specifically, let it be assumed that the component is varied between mutually opposite phases in accordance with a binary code as indicated in FIG. 7. Let it further be assumed that the width of the conductors 11 is equal to the width of a binary bit of the binary code, i.e., to the distance along the tape required to record a single cycle of the constant frequency signal indicated in FIG. 7. Initially, the signals induced in coils 17, 19 and integrated by integrating amplifiers 23, 27 and appearing on lines 29 and 35 will be of small amplitude and will vary about zero amplitude in a more or less random manner. This will occur until the portion of the complex signal having the time distribution in accordance with the binary code is in exact time coincidence with the segments of the coded playback head 15 corresponding thereto; i.e., when each binary bit of the coded sequence is under a corresponding binary bit or the magnetic conductor sets 11 and 13. At this time a large amplitude, roughly sinusoidal signal will be produced by each of the playback amplifiers 23 and 27, which will be summed by summing amplifier 37 to produce a signal such as is indicated in FIG. 8. The entire signal produced by the complex electrical signal is recorded by recorder 41 as a function of time. Therefore, the relative location in time of the desired component can be readily determined by examining the trace produced by recorder 41.

Manifestly, the signal produced by only one of the sets of magnetic conductors will also produce a signal indicative of the location in time of the desired component of the complex electrical signal; however, the apparatus illustrated in FIG. 1 will be found to have a much higher signal-to-noise ratio than when a single set of magnetic conductors is used. However, should it be desired to use only a single set of magnetic conductors, the spaces occupied by the other set of magnetic conductors can be replaced by a nonmagnetic conductor, such as brass, as illustrated in FIGS. 4 and 5. This has the advantage, also, of permitting the individual magnetic conductors 45 (corresponding to either of the magnetic conductor sets 11 and 13) to be of a circular rather than an elliptical configuration.

It is further to be noted that if the width of the individual magnetic conductors illustrated in FIG. 1 were only the distance on the time axis of the tape required for the recordation of a half-cycle of the signal of FIG. 7, then the spacial distribution of the magnetic conductors could be in accordance with either of two arrangements. One set of conductors could be spaced to be over positive half-cycles of the recorded signal, and the other set of conductors could be spaced so that the individual conductors are over negative half-cycles of the recorded signal when the recorded signal is in spacial time coincidence with the coded playback head 15. Alternatively, the individual magnetic conductors of one set could be arranged so that they would be over the recording of positive half-cycles of one binary bit, and the conductors of the other set would be over the negative half-cycles of the other binary bit when the desired component is in spacial coincidence with the coded playback head. Also, the magnetic conductors can be made very thin and properly spaced apart so as to be over a particular positive or negative half-cycle, as described above, rather than being a half-cycle or full cycle in width. The correlation signal will then have the general shape illustrated in FIG. 9. Brass segments may be used as spacers when the magnetic conductors of the sets are over only positive half-cycles of the recorded signal corresponding to respective binary bits, or when very thin segments are used.

It is further to be noted that a trinary coded signal can be correlated using the configuration of FIG. 1 with the addition of nonconductors spacing apart the two sets of magnetic conductors, the nonconductors corresponding to the third state of the recorded signal.

Although the embodiments disclosed in the preceding specification are preferred, other modifications will be apparent to those skilled in the art which do not depart from the scope of the broadest aspects of the invention.

What is claimed is:

1. Apparatus for determining the time-phase relationship of components of a complex electrical signal having a characteristic that is variable in accordance with a multibit binary code group, comprising:
   a magnetic recording medium;
   transport means for said magnetic recording medium;
   a recording head operatively positioned relative to said recording medium to record said electrical signal on said recording medium;
   a reproducing head operatively positioned relative to said recording medium, said reproducing head comprising first and second sets of magnetic conductors, said magnetic conductors of said second set being linearly positioned one relative to the other according to the bits of said code group, wherein said magnetic conductors of said first set represent bits of one character and magnetic conductors of said second set represent bits of another character;
   first means coupled to said magnetic conductors of said first set for producing an electrical signal indicative of the total magnetic flux changes therein;
   second means coupled to said magnetic conductors of said second set for producing an electrical signal indicative of the total magnetic flux changes therein;
   circuit means coupled to said first and second means for producing an output signal indicative of the sum of the signals produced by said first and second means; and
   means connected to said circuit means for recording the output signal thereof as a time function.

2. Apparatus for determining the time-phase relationship of components of a complex electrical signal having a characteristic that is variable between two conditions in accordance with a multibit binary code, each bit having a fixed time duration, comprising:
   a magnetic recording medium;
   transport means for said magnetic recording medium;
   a recording head operatively positioned relative to said recording medium to record said electrical signal on said recording medium;
   a reproducing head operatively positioned relative to said recording medium, said reproducing head comprising first and second sets of laminations, said laminations of said first set and said laminations of said second set being linearly positioned one relative to the other according to said binary code, wherein said laminations of said first set represent binary digits of one character, and said laminations of said second set represent binary digits of the opposite character;

first means coupled to said laminations of said first set for producing an electrical signal indicative of the total magnetic flux change therein at any time;

second means coupled to said laminations of said second set for producing an electrical signal indicative of the total magnetic flux change therein at any time;

first and second integrating means respectively coupled to said first and second means for integrating the electrical signals produced thereby;

summing means coupled to said first and second integrating means for summing said electrical signals produced by said first and second integrating means; and means connected to said summing means for recording the output signal of said summing means as a function of time.

3. Apparatus for determining the time-phase relationship of components of a complex electrical signal having a characteristic that is variable between two conditions in accordance with a multibit binary code, each bit having a fixed time duration, comprising:

a magnetic recording medium;

transport means for said magnetic recording medium;

a recording head operatively positioned relative to said recording medium to record said electrical signal on said recording medium;

a reproducing head operatively positioned relative to said recording medium, said reproducing head comprising first and second sets of laminations, said laminations of said first set and said laminations of said second set being linearly positioned one relative to the other according to said binary code, wherein said laminations of said first set represent binary digits of one character, and said laminations of said second set represent binary digits of the opposite character;

first means coupled to said laminations of said first set for producing an electrical signal indicative of the total magnetic flux change therein at any time;

second means coupled to said laminations of said second set for producing an electrical signal indicative of the total magnetic flux change therein at any time;

first and second integrating means respectively coupled to said first and second means for integrating the electrical signals produced thereby;

summing means coupled to said first and second integrating means for summing said electrical signals produced by said first and second integrating means;

and means connected to said summing means for recording the output signal of said summing means as a function of time;

each of said laminations being generally elliptically annular and having a small air gap adjacent said magnetic recording medium, the axis of said first and second sets of laminations being winded on opposite sides of a plane normal to the surface of said magnetic medium.

References Cited

UNITED STATES PATENTS

| | | | |
|---|---|---|---|
| 3,199,106 | 8/1965 | Karr | 343—17.2 |
| 3,247,483 | 4/1966 | Wood | 340—146.3 |
| 3,371,196 | 2/1968 | Lerwill | 235—181 |

MALCOLM A. MORRISON, *Primary Examiner.*

FELIX D. GRUBER, *Assistant Examiner.*

U.S. Cl. X.R.

235—183; 324—77; 340—15.5